Sept. 6, 1966 T. ARMSTRONG 3,270,788
FRUIT ORIENTING, HALVING, AND CORING MACHINE
Filed Sept. 3, 1963 4 Sheets-Sheet 1

INVENTOR.
THEODORE ARMSTRONG
BY
Flam and Flam
ATTORNEYS.

INVENTOR.
THEODORE ARMSTRONG
BY
Flam and Flam
ATTORNEYS.

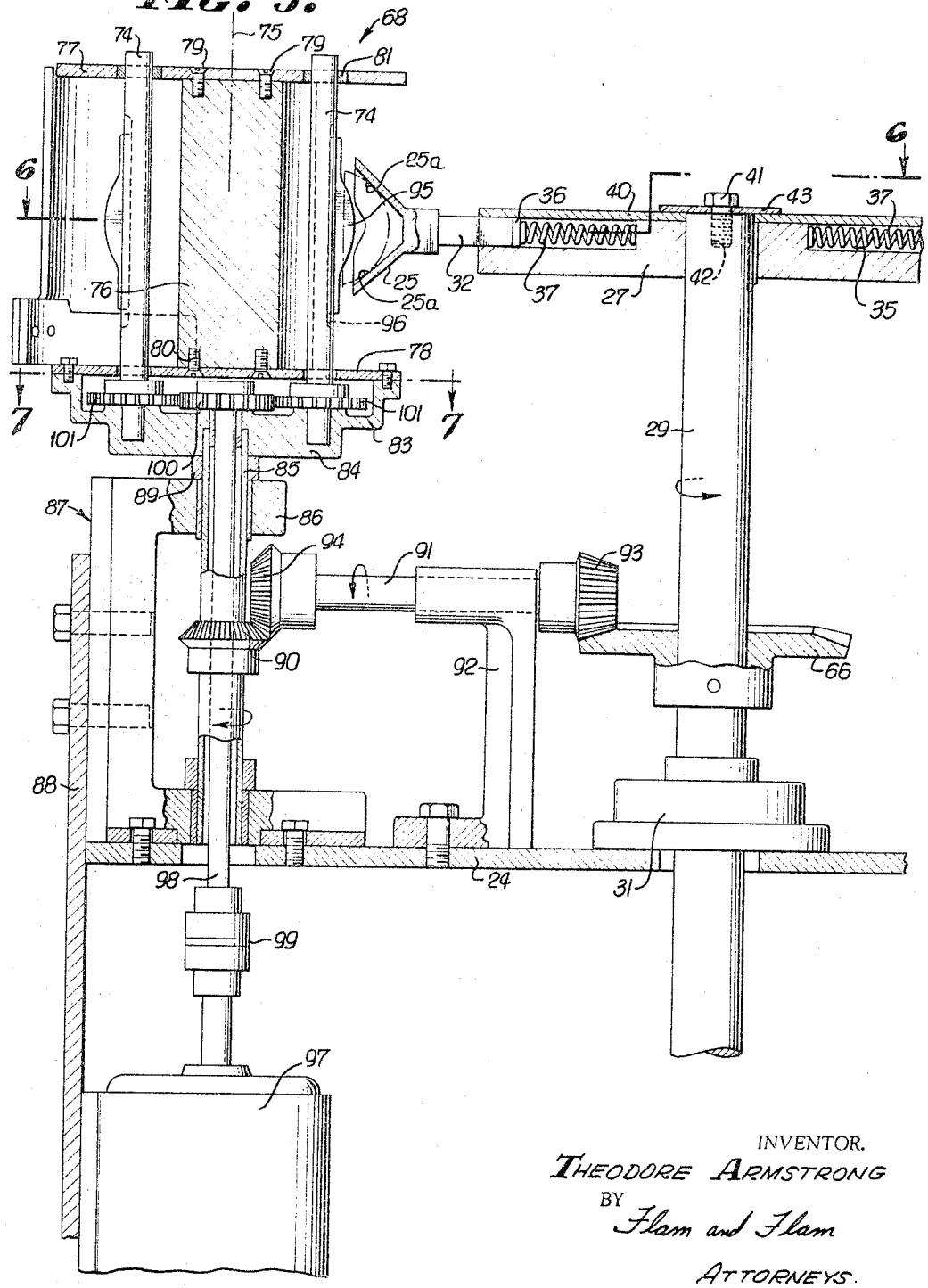

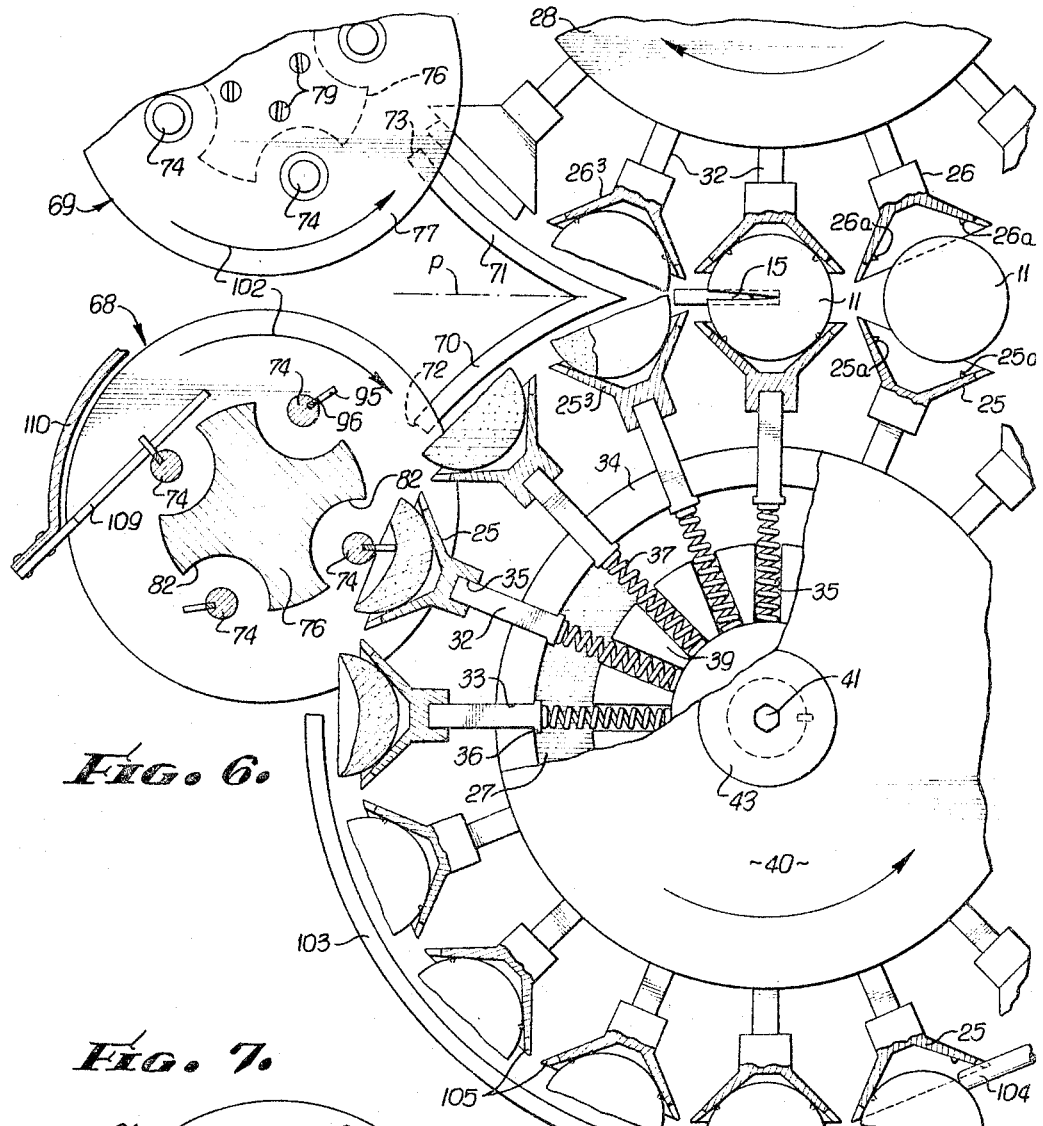

United States Patent Office 3,270,788
Patented Sept. 6, 1966

3,270,788
FRUIT ORIENTING, HALVING, AND
CORING MACHINE
Theodore Armstrong, Torrance, Calif., assignor, by mesne assignments, to Pacific Preserving Co., Gardena, Calif., a corporation of California
Filed Sept. 3, 1963, Ser. No. 305,991
9 Claims. (Cl. 146—52)

This invention relates to apparatus for coring fruit such as apples or pears.

Known machines for performing such functions require hand placement of the fruit into cups or receivers. This is normally required since the axis of the fruit core must be aligned with the cutters. After placement in the cups or receivers, the machine bores through the core, ejects the core, clasps the fruit, transfers it, cuts out the seed pocket, and finally deposits the whole fruit upon a spindle for passage through knife edges that cut the fruit into neat sections.

One of the important objects of this invention is to provide a unique coring machine that automatically orients the axis of the fruit core so that human loading is obviated. I have discovered that vibration of a support results in vertical orientation of the core. Thus, in order to accomplish this result, the fruit is vibrated as it enters the machine, thus achieving the required core alignment.

Another important object of this invention is to provide a core machine in which each fruit is grasped by a single pair of jaws, and continuously held by those jaws until cored and discharged from the machine. Not only is the machine materially simplified by this arrangement, but the possibility of damage to the fruit is virtually eliminated.

Another object of this invention is to provide an extremely compact machine having a minimum of parts simplifying maintenance and cleaning.

One of the problems of prior fruit coring apparatus is that it is difficult to eject the core without leaving some residue. Another object of this invention is to provide new coring means that eliminates the danger of leaving undesired residue. For this and other purposes, my machine first cuts the fruit in halves, exposing the respective halves of the core. Rotary knives extract the core halves simultaneously with the seed pocket.

Another object of this invention is to provide unique simple mechanisms for causing the knives and the fruit to move in paths that will accomplish the desired coring.

Still another object of this invention is to provide mechanisms of this character that can, by simple means of adjusting motor or transmission speed, control the speed of the entire machine.

This invention possesses many other advantages, and has other objects which may be made more clearly apparent from a consideration of one embodiment of the invention. For this purpose, there is shown a form in the drawings accompanying and forming a part of the present specification, and which drawings are true scale. This form will now be described in detail, illustrating the general principles of the invention; but it is to be understood that this detailed description is not to be taken in a limiting sense, since the scope of this invention is best defined by the appended claims.

Referring to the drawings:

FIG. 5 is an enlarged fragmentary sectional view taken along a plane corresponding to line 5—5 of FIG. 1;

FIG. 6 is an enlarged fragmentary sectional view taken along the offset plane indicated by line 6—6 of FIG. 5; and FIG. 7 is a fragmentary sectional view taken along a plane corresponding to line 7—7 of FIG. 5.

Figure 2:
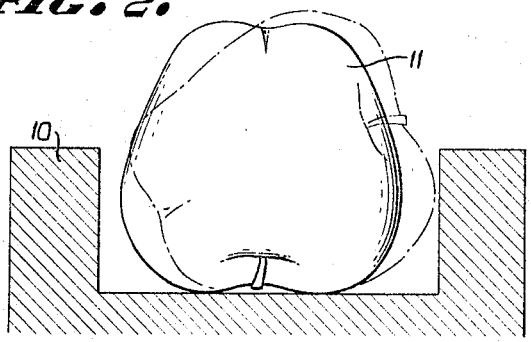
FIG. 2 is an enlarged sectional view taken on a plane corresponding to line 2—2 of FIG. 1.
Figure 3:
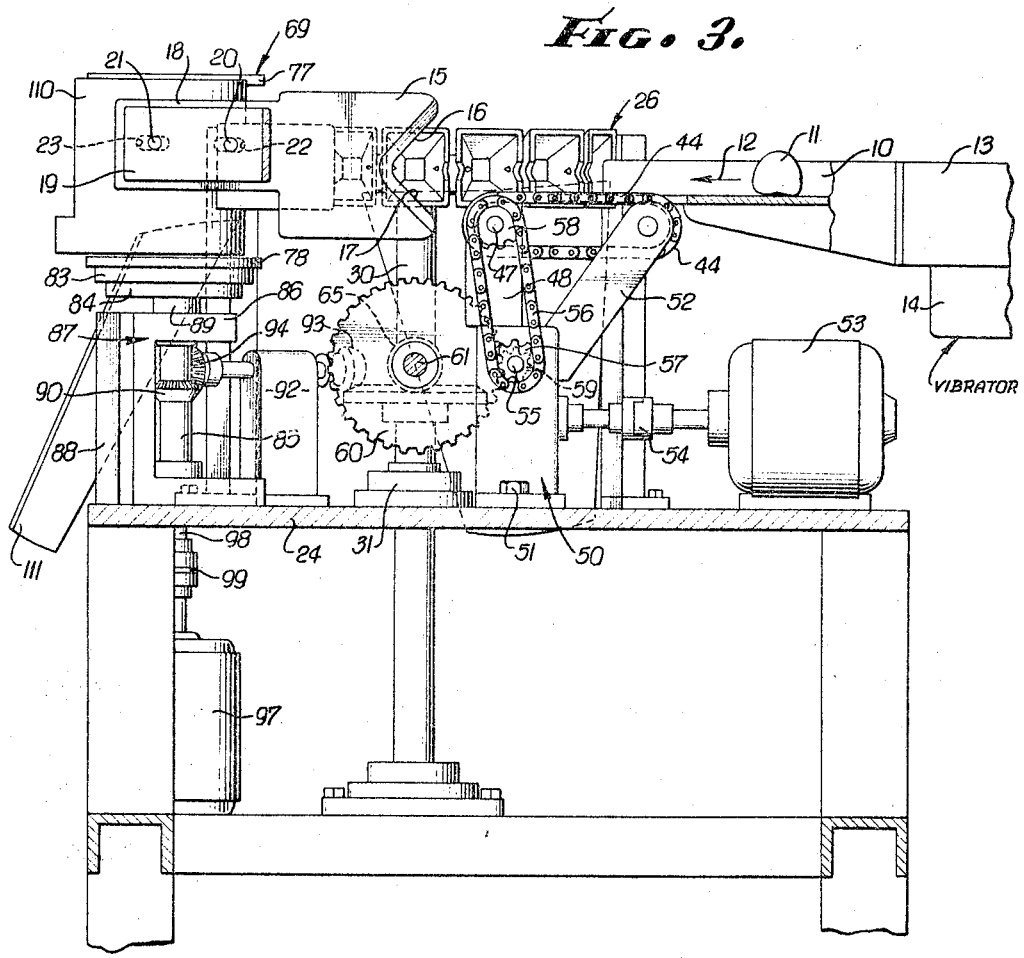
FIG. 3 is a side elevational view of the apparatus shown in FIG. 1.
Figure 4:
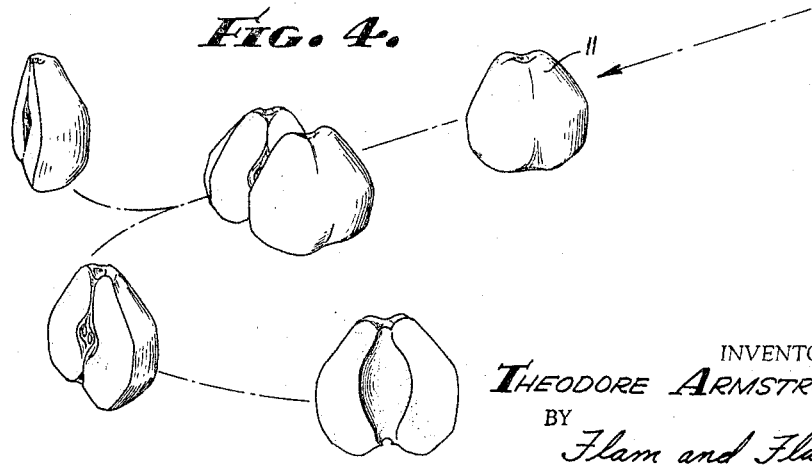
FIG. 4 is a diagrammatic view illustrating the coring process.

In FIGS. 2 and 3 there is illustrated a channel 10 for feeding fruit, in this instance peeled apples 11, to the coring machine. The channel 10 may be slightly inclined with respect to the horizontal in order to determine a normal feed in the direction of the arrow 12. The channel 10 is shown as a part of conveyor apparatus 13. The channel is vibrated by a vibrator 14, which may be of any one of a number of known types.

An apple characteristically has a substantial depression at the area of the stem, as well as a small depression at the blossom end of the fruit. When the apple rests upon a support with the stem depression lowermost, the fruit is quite stable since there is a large circular line of contact surrounding the stem. When the fruit is in any other position, it is relatively unstable and prone to rotate. Accordingly, by vibrating the channel 10, the fruit rotates until it ultimately arrives at this most stable position, namely, stem end down. By keeping the amplitude and frequency of vibration within suitable limits, the gravitational force of the fruit itself resists further rolling action. Yet vibrations assist in the movement of the fruit so oriented along the channel. I have found that by vibration it is possible to orient a very substantial percentage, approaching 100%.

As the fruit reaches the end of the channel 10, its core is oriented vertically. Opposed to and spaced from the end of a channel is a knife 15 (FIGS. 3 and 6). The knife 15 extends in a vertical plane p, the extension of which bisects the channel 10. The knife 15 has upper and lower forwardly inclined cutting edges 16 and 17 extending from a common apex. The apex is located above the level of the channel floor at the height of the center of the fruit 11. By advancing the fruit along the cutting plane of the knife 15, maintaining the orientation thereof, the fruit is cut precisely in two along the axis of its core.

Figure 1:
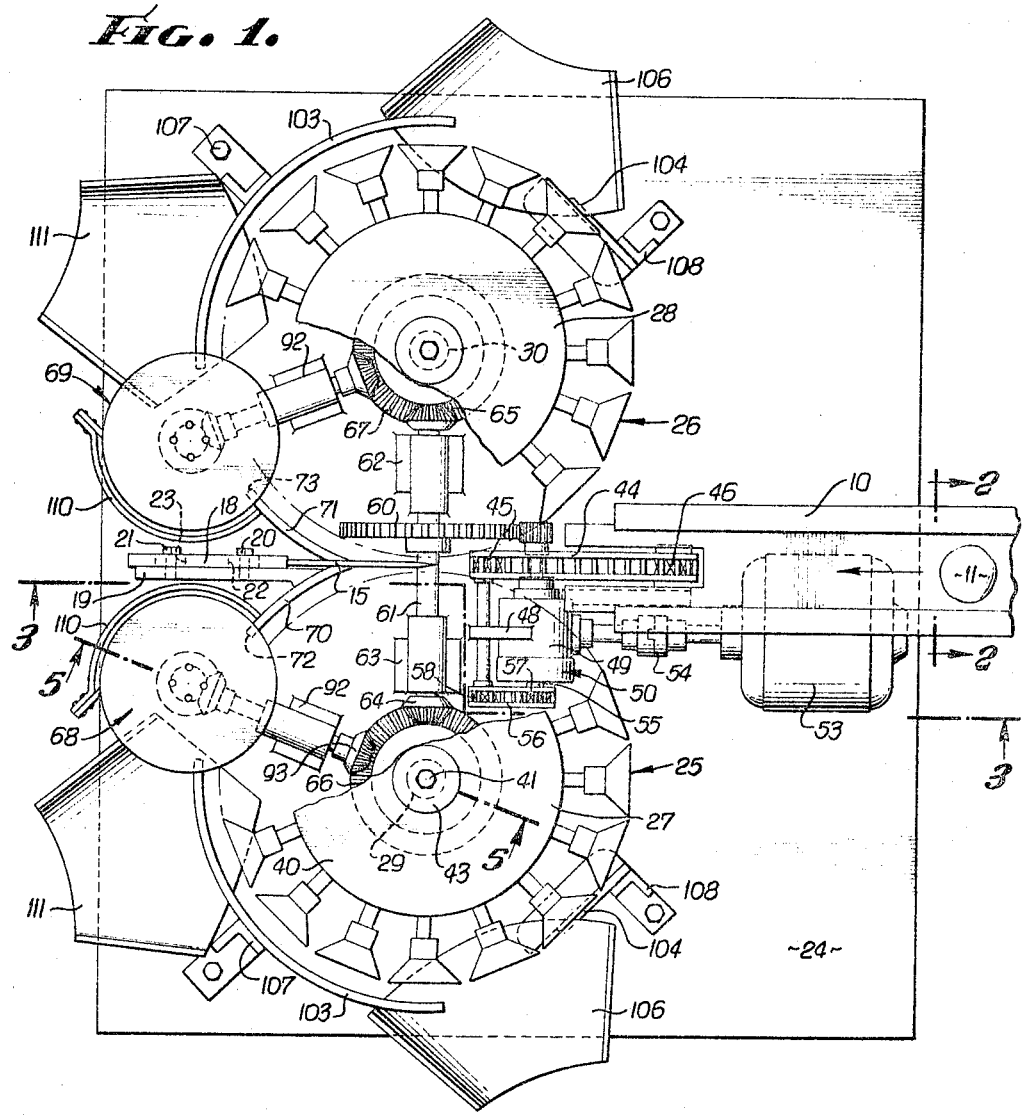
FIGURE 1 is a top plan elevational view of a coring machine incorporating my invention.

The knife 15, as shown in FIG. 1, has a base end 18 fastened to an upright or support 19. A pair of machine screws 20 and 21 pass through slots 22 and 23 and engage the upright 19. The support 19 projects upwardly from a horizontal table 24.

In order to move the fruit from the end of the channel 10 past the cutting edges 16 and 17, while maintaining the vertical orientation of the fruit core, two sets of cups 25 and 26 are provided. The cup sets 25 and 26 move in circles substantially tangent to each other at the cutting plane p, with the cups facing outwardly. The fruit is fed by the channel 10 to the area in advance of the tangent point so as to be claspel by a pair of cups, one of the set 25 and the other of the set 26. The fruit so clasped is carried through the tangent point at which the cutting knife 15 is located.

When the cups are tangent to the cutting plane p, their axes are perpendicular thereto and at the same level as the apex of the knife 15. Due to the converging configuration of the seats formed by cups, the fruit is centered at the axes of the cups, and thus centered relative to the knife apex. As the fruit is received by the cups, they may be lifted or lowered as they move to seat in the cups depending on the size of the fruit, and centering is achieved.

The cups 25 and 26 are respectively mounted upon turrets 27 and 28. The turrets 27 and 28 are carried at the upper ends of vertical shafts 29 and 30 located equidistantly and symmetrically on opposite sides of the cutting plane p. These shafts as shown, for example, in FIGS. 3 and 5, are mounted upon bearings as at 31 carried by the table 24. A detailed description of one of the sets of cups will suffice as a description of the others since the cups are identical.

Each cup 25 is formed substantially as a cone frustum with the base of the frustum open to form a recess for receiving the fruit. The cups 25 are of such size as to permit entry of less than half of the fruit. Prongs 25a in the recesses slightly penetrate the fruit for holding them in place. In the present instance, there are sixteen cups 25 each facing outwardly of the turret 27 in equiangularly spaced array. Each cup is supported at one end of a noncircular slide 32. Each slide is accommodated in a slot 33 formed in a peripheral upstanding rim 34 of the turret 27. One end of the side 32 projects radially outwardly of the turret and is accommodated in a rearwardly facing recess 35 formed in the hub located rearwardly of the apex of the corresponding cup 25. The inner end of each slide 32 is provided with a flange 36 to limit outward movement. A compression spring 37 for each slide is mounted upon the turret 27 and normally urges the slide 32 outwardly. The springs 37 are seated in slots 38 formed in the hub 39 of the turret 27. A plate 40 overlies the turret 27 and closes the slots 33 and 38 to confine the parts. A machine screw 41 threadedly attached at an aperture 42 in the upper end of the shaft 29 by the aid of an underlying disc 43 clamps the cover plate 40 to the turret 27.

The shafts 29 and 30 are so spaced and the parts are so proportioned that the cups 25 and 26 will closely approach the cutting plane p. By moving the shafts 29 and 30 in position synchronism, the fruit 11 (FIG. 6) is thus firmly gripped and carried past the knife 15.

The knife 15 is located so as to perform the cutting operations upon the fruit 11 before the halves move past the point of tangency. There is thus no tendency for the diverging motion of the cups to tear the fruit apart. Adjustment of the knife position ensures this result.

Since the slides 32 are capable of radial movement, they can accommodate themselves to fruit 11 of slightly different sizes. Thus the larger the fruit 11, the farther will the slides 32 move inwardly as they pass the cutting knife 15. The cups $25^3$ and $26^3$ have passed the knife 15 and are moving apart together with the respective halves of the fruit 11. The halves of the core of the fruit are respectively exposed along the cut.

In order to assist the movement of the fruit into the converging spaces formed by the cups 25 and 26, a chain conveyor 44 (FIGS. 1 and 3) may be provided. The chain conveyor at one end forms a continuation of the bottom of the channel 10. The other end of the chain conveyor projects between the cups and terminates short of the cutting knife 15. The conveyor 44 is mounted upon a pair of sprocket wheels 45 and 46 (FIG. 1). The sprocket wheel 45 is mounted at one end of a horizontal outboard shaft 47 in turn journalled in a bracket 48 attached to the casing 49 of a gear box 50. The gear box 50 is secured to the table 24 as by bolts 51. The other sprocket 46 (FIG. 3) is mounted upon a bracket 52 projecting from the casing of the gear box 50.

The gear box 50 serves as a means for synchronously driving the conveyor 44 as well as the turret shafts 29 and 30. A motor 53 attached to the table 24 through a suitable detachable coupling 54 operates the gear box 50. The gear box has a horizontal output shaft 55 parallel to the outboard shaft 47. Both ends of the output shaft are accessible beyond the casing 49. One end of the shaft 55 drives the sprocket 45 for the conveyor chain 44. For this purpose a chain 56 is provided that cooperates with sprocket wheels 57 and 58 (FIG. 3) mounted on the shafts 55 and 47 respectively.

The other end of the gear box shaft 55 carries a pinion 59 for operating the turrets 27 and 28. The pinion 59 meshes with a spur gear 60 mounted on a horizontal shaft 61. The shaft 61 is perpendicular to the cutting plane p and located substantially beneath the knife 15. Bearing brackets 62 and 63 supporting the shaft are attached to the table 24. Opposite ends of the shaft 61 carry bevel gears 64 and 65 (see FIGS. 1 and 5) that cooperate with bevel gears 66 and 67 respectively carried by the vertical turret shafts 29 and 30. Accordingly, upon rotation of the spur gear shaft 61, the sets of cups are rotated in synchronism.

If desired, the gear box may be capable of operation at any one of a number of different speeds in order to adjust the speed of the process.

The respective halves of the fruit are carried past coring devices generally designated at 68 and 69 which are symmetrically disposed on opposite sides of the cutting plane on the side of the apparatus remote from the feeding channel 10. In order to hold the fruit in the cups 25 and 26 until reaching the coring devices, arcuate guides 70 and 71 are provided that are attached to the support 19 (see FIG. 1). A description of one of the coring devices suffices as a description of the other.

As the fruit half clears the end edge 72 of the guide 70 (FIG. 6), one of a number of rotary knives 74 moves into engagement with the center of the fruit half. These knives 74 move in a circular path tangent to the circular path of the fruit. Thus the knives move to engage the fruit as the tangency point is reached.

The cutting assembly 68 in this instance has four rotary knives 74 equiangularly arrayed about the vertical axis 75 of a support 76. The support 76 is fastened to top and bottom circular plates 77 and 78 by the aid of screws 79 and 80. The knives 74 are located about the periphery of the support 76 and have upper ends received in bearing bushings 81 carried by the upper plate 77. The lower ends of the knives extend through the lower plate 78 by means hereinafter to be described. The support 76, as shown in FIG. 6, has arcuate recesses 82 at the center of which the respective knives 74 are disposed.

The lower plate 78 is fastened to a peripheral flange or rim 83 of a support 84. The support 84 in turn is mounted upon a hollow shaft 85 situated at the axis 75. The support 84 and hence the knives 74 are moved in position synchronism with the cups 25 so as to engage the center of the fruit halves. Accordingly, the hollow shaft 85 is rotated in synchronism with the turret shaft 29.

For this purpose the hollow shaft 85 is journalled in bearings carried by arms 86 of a bearing bracket 87. The bracket 87 is fastened to an upstanding frame element 88. A collar 89 spaces the support 84 from the arm 86 and surrounds the hollow shaft 85.

The hollow shaft 85 intermediate the bracket arms carries a bevel gear 90 at the level of the gear 66 carried by the turret shaft 29. The gears 66 and 90 are connected by the aid of a transfer shaft 91 supported in a bearing bracket 92. Opposite ends of the transfer shaft 91 carry bevel gears 93 and 94 respectively engageable with the bevel gears 66 and 90. Thus as the turret shaft 29 is rotated by the gear box 50 and associated mechanisms, the support 84 and the knives 74 are correspondingly rotated. Since there are four knives 74 and sixteen cups 25, the rate of rotation of the support 84 is precisely four times that of the cup shaft 29.

The knives 74 carry blades 95 having a configuration designed to extract not only the core of the fruit but also the seed pocket. Thus the blades 95 have intermediate bulged portions. Different blades may be provided for different fruit. The blades 95 are accommodated in elongate slots 96 formed in the knives 74. Since the cups center the fruit, the seed pocket is accurately positioned relative to the center of the blades 95.

In order to rotate the knives 74, a motor 97 is provided (FIG. 5). The motor 97 is located beneath the table 24 and on the frame element 88. The motor drives a shaft 98 by the aid of a coupling 99. The shaft 98 projects upwardly through the hollow shaft 85 and through the base 84. The upper end of the shaft 98 carries a sun gear 100 that meshes with planetary gears 101 mounted at the lower ends of the knives 74. The lower ends of the knives 74 are journalled in bearing bosses formed in the bottom of the base 84.

As the shaft 98 is rotated by the motor 97, the sun gear 100 rotates the planetary gears 101 and the individual knives 74 are rotated. By virtue of the sun-planet arrangement of the gears, rotary movement motion of the support 84 does not interfere with the coupled relationship thereof.

As the base 84 moves as indicated by the arrow 102 in FIG. 6, the knife blades 95 and the fruit move into and out of tangent relationship. When the knives and fruit have moved apart, the fruit is cored. An arcuate guide 103, the end edge of which just clears the knives 74, holds the fruit halves in their cups.

Ultimately the fruit is ejected by the aid of a push rod 104 located at an area beyond the other end edge of the guide 103. The push rod 104 enters a slot 105 formed in the cup 25 so as to dislodge the fruit from the retaining prongs. A chute 106 (FIG. 1) is positioned to receive the ejected fruit half. The chute 106 may discharge the fruit into a suitable vessel or to a conveyor for further processing or packaging.

The guide 103 is mounted by an upright support 107 (FIG. 1) in turn fastened to the table 24. The push rod 104 is similarly mounted upon a support 108 attached to the table 24.

The core removed from the fruit halves tends to collect about the knives 74 and to gravitate toward the lower plate 78. This material is removed by flexible scrapers 109 attached to an arcuate shield 110. A chute 111 suitably located receives the waste material.

The knives, cups, arcuate guides and push rods are quite accessible for cleaning and repair. The knives 74 can be removed after detachment of the top plates as at 77. Cups designed to fit other fruit can readily be substituted. It is only necessary to remove the screw 41 and the cover plate 40.

The inventor claims:

1. In apparatus for processing apples or similar substantially spherical fruit having a core axis and a depression at least at one end of the core axis defining a relatively stable rest position: means forming a substantially flat and generally horizontal supporting surface for the uncored fruit and upon which the fruit is capable of movement; means vibrating the supporting surface to rotate fruit into such stable rest position whereby the core is oriented with its axis vertical and substantially perpendicular to said supporting surface; means grasping the core oriented fruit for subsequent coring and means channelling the fruit along said supporting surface to said grasping means.

2. The combination as set forth in claim 1, in which said channelling means comprises a channel having side walls and a bottom wall defining said supporting surface, the side walls of said channel being spaced from each other by an amount sufficient to allow free progress of the fruit along said channel.

3. In apparatus for processing apples or similar substantially spherical fruit having a core axis and a depression at least at one end of the core axis defining a relatively stable rest position: means forming a substantially flat and generally horizontal supporting surface for the uncored fruit and upon which the fruit is capable of movement; means vibrating the supporting surface to rotate fruit into such stable rest position whereby the core is oriented with its axis vertical and substantially perpendicular to said supporting surface; a pair of cups; means determining separate circuitous substantially horizontal paths of movement of the cups, said paths converging adjacent said supporting surface for grasping the oriented fruit between the cups for subsequent coring; and means channelling the fruit along said supporting surface to said place of convergence of said paths.

4. In apparatus for coring substantially spherical fruit having a core axis extending through its seed cell: a pair of fruit holders; means determining separate circuitous paths of movement of the holders, said paths having substantially parallel runs in which the holders are opposed to each other, said paths converging in advance of the start of said parallel runs and diverging from the end of said parallel runs; means for feeding fruit between the holders in advance of said parallel runs with the core axes perpendicular to the said paths; said holders having provisions for centering the seed cells relative to the holders; a cutting knife located between said paths at the parallel runs; a pair of rotary knife devices for the holders respectively; means for moving the knife devices in paths having runs substantially paralleling the paths of said holders respectively; said knife devices each having operative fruit cutting parts located both above and below the position of the seed cell determined by said holders.

5. In apparatus for coring fruit having a core axis extending through its seed cell: a knife for cutting fruit in two parts; said knife extending in a plane; a pair of turrets revolvable about axes parallel to and symmetrically located on opposite sides of said plane; a set of fruit holders for each turret and equiangularly located thereabout, said holders having recesses in which the fruit may be partially received; said recesses facing radially outwardly of the corresponding turret; each holder moving into and out of substantially tangent relationship with respect to said plane; said knife being located adjacent the area of tangent relationship; means for moving the turrets in synchronism such that pairs of holders converge and diverge about the said area of tangency; means for retaining the fruit halves in the respective holders after movement of the fruit past said knife; a rotary coring unit for each of the fruit halves, each coring unit having a number of rotary knives, a support rotatable about an axis parallel to said plane and mounting the rotary knives for orbital movement substantially tangent to the path of the holders and for angular movement about axes parallel to the axis of said rotatable support; said rotary knives having operative parts extending parallel to their said axes; means for rotating the knives about their own axes; and means for rotating the support in position synchronism with the corresponding turret whereby the knives move to engage the center of the fruit for removing their cores both above and below the seed cell of the fruit halves.

6. In apparatus for coring fruit having a core axis extending through its seed cell: a knife for cutting fruit in two parts; said knife extending in a plane; a pair of turrets revolvable about axes parallel to and symmetrically located on opposite sides of said plane; a set of fruit holders for each turret and equiangularly located thereabout, said holders having recesses in which the fruit may be partially received; said recesses facing radially outwardly of the corresponding turret; each holder moving into and out of substantially tangent relationship with respect to said plane; said knife being located adjacent the area of tangent relationship; means for moving the turrets in synchronism such that pairs of holders converge and diverge about the said area of tangency; means for retaining the fruit halves in the respective holders after movement of the fruit past said knife; a rotary coring unit for each of the fruit halves, each coring unit having a number of rotary knives, a support rotatable about an axis parallel to said plane and mounting the rotary knives for orbital movement substantially tangent to the path of the holders and for angular movement about axes parallel to the axis of said rotatable support; said rotary knives having operative parts extending parallel to their said axes; means for rotating the knives about their own axes; means for rotating the support in position synchronism with the corresponding turret whereby the knives move to engage the center of the fruit for removing their cores both above and below the seed cell of the fruit halves; and means for ejecting the fruit from the holders after the holders have mounted past the corresponding coring unit, comprising a relatively stationary projection entering the sides of the passing holders.

7. In a fruit coring machine: a number of cups for holding fruit halves with the plane of the cut exposed; means for mounting the cups for movement in a circuitous path; a support; means mounting the support for rotation about an axis located laterally of said path; a shaft extending along the axis of the support and carrying a driving gear; a number of knives mounted on the support in angularly spaced arrangement and for rotation about their own axes parallel to the support axis; a driven gear carried by each of said knives and engaging said driving gear; means for rotating the support so as to cause the rotary knives to move into and out of tangent relationship with the path of the cups; means for moving the cups in position synchronism with the rotary knives; and means for rotating said shaft for operating said knives.

8. In a machine for coring fruit having a core axis extending through a seed cell: a support rotatable about an axis; a number of rotary knives equiangularly arrayed about the axis of the support; bearing means carried by the support and mounting said knives for rotation about substantially parallel axes spaced from the support axis; said knife axes being movable in a common path; a plurality of fruit cups; means mounting the fruit cups for circuitous movement in a path substantially tangent to the path of movement of said knives with cups facing outwardly and the axes of the cups perpendicular to the cup path; means successively placing fruit in the cups in advance of the place of tangency; means for halving said fruit along its core axis with the core axis mutually perpendicular to the cup axis and the cup path whereby the fruit cores are substantially parallel to the knife axes at the place of tangency; said rotary knives having parts for removing core material both above and below the seed cell.

9. A machine for coring fruit having a core axis extending through its seed cell; a number of cups for holding fruit halves with the plane of the cut facing outwardly of the cups; means mounting the cups for movement about an axis; a support; a hollow shaft mounting the support for rotation about an axis located laterally of the path of said cups and parallel to the axis of movement of the cups; a driving shaft extending through said hollow shaft and carrying a driving gear; a plurality of cutter shafts mounted on the support for rotation about axes parallel to said support axis; driven gears carried by the cutter shafts and engaging said driving gear for imparting rotation to said cutter shafts upon angular movement of said driving shaft; a cutter blade carried by each of the cutter shafts; means for rotating the hollow shaft to impart orbital movement to said cutter shafts to move said cutter blades successively into tangent relationship with said cup paths; means synchronized with the hollow shaft for rotating the cups; and means for rotating said driving shaft; said cutter blades having operative parts extending axially for removal of core parts located on opposite sides of said seed cells.

References Cited by the Examiner
UNITED STATES PATENTS

| | | | |
|---|---|---|---|
| 972,812 | 10/1910 | Burns | 146—52 |
| 1,079,573 | 11/1913 | Morton | 146—28 |
| 1,495,610 | 5/1924 | Paridon | 198—220 X |
| 2,155,612 | 4/1939 | Morris | 198—33 |
| 2,190,970 | 2/1940 | Ashlock | 198—33 |
| 2,231,002 | 2/1941 | Ewald | 146—52 |
| 2,333,435 | 11/1943 | Muskat | 198—220 |
| 2,614,593 | 10/1952 | Arengo-Jones | 146—52 X |
| 2,682,900 | 7/1954 | Whitehead | 146—3 |
| 2,788,819 | 4/1957 | Guatelli et al. | 146—28 |
| 2,858,863 | 11/1958 | Lorenzen | 146—72 |
| 3,101,831 | 8/1963 | Gaddini | 193—33 |

LESTER M. SWINGLE, *Primary Examiner.*

J. SPENCER OVERHOLSER, ROBERT C. RIORDON,
*Examiners.*

W. G. ABERCROMBIE, *Assistant Examiner.*